(12) United States Patent
Rosenberg et al.

(10) Patent No.: US 7,192,568 B2
(45) Date of Patent: Mar. 20, 2007

(54) PROCESS FOR FILTER AID PRODUCTION IN ALUMINA REFINERIES

(75) Inventors: Steven P. Rosenberg, Australind (AU); Darrel J. Wilson, Australind (AU)

(73) Assignee: Worsley Alumina Pty. Ltd., Collie (AU)

( * ) Notice: Subject to any disclaimer, the term of this patent is extended or adjusted under 35 U.S.C. 154(b) by 616 days.

(21) Appl. No.: 10/333,211

(22) PCT Filed: Jul. 20, 2001

(86) PCT No.: PCT/AU01/00886

§ 371 (c)(1), (2), (4) Date: Jul. 31, 2003

(87) PCT Pub. No.: WO02/11856

PCT Pub. Date: Feb. 14, 2002

(65) Prior Publication Data

US 2004/0101470 A1    May 27, 2004

(30) Foreign Application Priority Data

Jul. 20, 2000    (AU) .................................... PQ8891

(51) Int. Cl.
C01F 7/06 (2006.01)
C01F 7/16 (2006.01)

(52) U.S. Cl. .................................................. 423/600

(58) Field of Classification Search ................ 423/115, 423/600; 502/414
See application file for complete search history.

(56) References Cited

U.S. PATENT DOCUMENTS

| 4,597,952 A | 7/1986 | Fabre et al. |
| 5,387,405 A * | 2/1995 | Connelly et al. ........... 423/122 |
| 5,888,461 A | 3/1999 | Soirat |
| 6,077,486 A | 6/2000 | Spitzer |

FOREIGN PATENT DOCUMENTS

| EP | 1022253 A | 7/2000 |
| WO | WO 00/64812 A | 11/2000 |

OTHER PUBLICATIONS

Whittington, B.I., Fallows, T.M., and Willing, M.J., "Tricalcium aluminate hexahydrate (TCA) filter aid in the Bayer industry: factors affecting TCA preparation and morphology," International Journal of Mineral Processing, vol. 49 (1997), pp. 1-29, no month.

* cited by examiner

*Primary Examiner*—Steven Bos
(74) *Attorney, Agent, or Firm*—Edell, Shapiro & Finnan, LLC

(57) ABSTRACT

An improved process for the production of tricalcium aluminate (TCA) filter aid for use in an alumina refinery is described. Quicklime is slaked in a slaker tin using a suitable slaking solution to form a slaked lime slurry (10). A suitable surface-active agent is added to the slaking solution prior to slaking of the lime. Alternatively, the surface-active agents can be added to the slaked lime either during slaking or after slaking. The slaked lime slurry is then transferred to a stirred storage/transfer tank (12) before it is pumped to a lime aging tank (14). A concentrated Bayer liquor and steam are added to the tank (14) to provide a caustic aluminate solution that reacts with the slaked lime. Sufficient residence time is allowed in the lime aging tank (14) for the initial product of the reaction to "age" before use, forming relatively pure particles of the thermodynamically stable TCA. The addition of a suitable surface-active agent or agents at the appropriate concentration will significantly improve TCA formation in the lime aging facility. These improvements include a narrower and more symmetric sized distribution, and a more crystalline structure, leading to substantially improved filtration characteristics.

22 Claims, 1 Drawing Sheet

PROCESS FOR FILTER AID PRODUCTION IN ALUMINA REFINERIES

FIELD OF THE INVENTION

The present invention relates to an improved process for the production of a calcium aluminate filter aid with enhanced liquor filtration characteristics for use within an alumina refinery.

BACKGROUND TO THE INVENTION

In most alumina refineries, bauxite is digested in a caustic solution under conditions of elevated temperature and pressure. This yields a slurry of mud in a concentrated sodium aluminate solution which must then be clarified to produce a solids-free liquor and a thickened mud that is subsequently washed and discarded. The prevalent technique for slurry clarification involves allowing the solids to settle in gravity thickeners (or mud settlers), and decantation of the clarified liquor. The separation of the mud from the concentrated liquor is assisted with flocculants, whilst the "green" (or pregnant) liquor, which is free of all but the finest suspended solids, overflows from the mud settlers. It is normal for the decanted liquor to then be further clarified by filtration, typically using pressure filters. This so-called "security" or "polishing" filtration step is critical in ensuring that the pregnant liquor is free of suspended mud particles that would otherwise result in contamination of the product alumina.

Unaided, the cloths employed in these filters would blind very quickly. This occurs because the fine suspended solids in the green liquor become entrapped within the weave of the cloth, and then proceed to form a dense, highly resistive bed at the filter's surface.

To prevent this, it is common practice to supplement the feed to the polishing filter with a filter aid, which acts to prevent cloth blinding by the continuous formation of a bed of solids which trap the mud particles whilst still allowing the free flow of liquor through the interstices of the bed. An ideal filter aid will be cheap, chemically inert, and of such a size that the channels that form between the filter aid particles are just small enough to trap the mud particles, but not so small that they restrict the flow of liquid, or contribute to blinding of the filter cloth themselves. In most alumina refineries, this role is performed by tricalcium aluminate (also referred to as TCA, C3A or C3AH6).

TCA is chosen as it meets the above requirements tolerably well. It is cheap and relatively simple to produce, being formed through the reaction of lime (either as quicklime or, more usually, slaked lime) with caustic aluminate solutions. Generally, the production of TCA is performed in concentrated liquors (either pregnant or spent) at temperatures of approximately 100° C., in tanks dedicated to the purpose. The initial products of the reaction are calcium aluminate species of the C4A type (the most common form of which is also referred to as hydrocalumite). These intermediate calcium aluminate species are thermodynamically unstable under such conditions and possess relatively high solubility products. Use of these intermediate species as filter aids is uncommon, because their comparatively high solubility can result in calcium contamination of the product alumina. TCA, on the other hand, has an extremely low solubility, so its use does not result in appreciable contamination of the refinery's liquor stream. For this reason, sufficient residence time is allowed in the reaction vessel for the initial products of the reaction to "age" before use, forming relatively pure particles of the thermodynamically stable tricalcium aluminate (TCA). The tanks in which the filter aid is produced are therefore often referred to as "lime ageing" tanks A serious drawback of the prior art technique for TCA filter aid production is that the distribution of TCA particle sizes is often very wide, and there is invariably a high proportion of very fine particles. This results in poor filtration rates and low filter cloth life, and necessitates the use of a large number of filters to achieve adequate filtrate flow.

Given the comparatively low solubility of calcium in Bayer liquors, it is reasonable to assume that reactions between calcium and the aluminate ion occur at the particle surface, rather than via the dissolution of calcium hydroxide and subsequent re-crystallisation of calcium aluminate. Examination of the reaction of individual slaked lime particles in Bayer liquors as a function of time, using scanning electron microscopy and XRD analysis suggests that this is indeed the case. A surface layer of C4A-type material forms rapidly at the surface of the particle, while the core remains unreacted. The surface develops a characteristic reticulated appearance arising from the formation of many randomly oriented platelets of C4A. At this early stage, the particle still retains the general form and size of the parent lime particle.

As the reaction proceeds, the core of unreacted lime diminishes, suggesting either that calcium ions are diffusing outwards towards the surface, or that aluminate ions are diffusing inwards. In addition, some of the surface C4A crystals begin to recrystallise into the familiar octahedral TCA crystals. However, C4A and TCA have a substantially different density to calcium hydroxide and as the reaction proceeds, internal stresses are generated within the crystal. Cracks and fissures develop within the particle, and as the reaction proceeds, the structure begins to crumble. Given sufficient time, the particle will ultimately degrade into individual TCA crystals, each only a few microns in size.

The inventors believe that it is this mechanism that results in the severely skewed, overly fine size distribution that is characteristic of TCA filter aid produced using the prior art technique. Given this mechanism, it is therefore not surprising that attempts to improve filter aid morphology and size distribution by altering the conditions in the lime ageing tanks are not successful.

In the absence of any effective means to improve the size distribution of the TCA filter aid itself, a few processes have been published which seek to alleviate the effect of poor quality filter aid. These prior art techniques invariably utilise flocculants, which serve to bind the decanted mud particles and fine TCA crystals into larger floccules. For example, in U.S. Pat. No. 5,091,159 Connelly et al. describes the addition of dextran to the thickener overflow and filter aid to improve filtration performance. A similar approach for use in refineries where sand filters are employed, rather than filter presses, is described in U.S. Pat. No. 5,716,530 by Strominger et al. Barham et al[1] describes the results of tests in which the filter aid is supplemented with a flocculant after it has been formed in lime ageing. However, these approaches are highly dependent upon the quality of the filter aid and the amount of suspended mud, and results can be variable. Furthermore, the flocculant itself can seriously impair filtration, particularly if overdosed (as can occur readily in an attempt to control an excursion in either TCA particle size or suspended mud).

The terms 'A' and 'C' used throughout this Specification refer to the alumina and caustic concentrations of a Bayer liquor, as per conventional alumina industry parlance. Hence 'A' is the concentration of sodium aluminate, expressed as the equivalent concentration of $Al_2O_3$, in g/L. The 'C' concentration is the sum of the sodium aluminate and sodium hydroxide concentrations, expressed as the equivalent concentration of sodium carbonate, in g/L.

SUMMARY OF THE INVENTION

The present invention was developed with a view to providing an improved process for the production of a TCA filter aid for use in alumina refineries that is less susceptible to at least some of the disadvantages of the prior art noted above.

According to the present invention there is provided a process for the production of TCA filter aid for use in an alumina refinery, the process including the steps of:

slaking lime in a slaking solution to form a slaked lime slurry;

dosing said slaking solution or slaked lime slurry with a suitable surface-active agent;

reacting the dosed slaked lime slurry with a Bayer process liquor; and, ageing the reaction products for a sufficiently long residence time to permit substantially complete conversion of the reaction products to TCA.

The steps of dosing and slaking may occur simultaneously or sequentially.

Preferably quicklime is slaked to form the slaked lime slurry. Preferably the slaking solution contains some alkali. Typically the slaking solution has an alkalinity which falls within the range of 5 to 30 g/l, expressed as equivalent grams per litre of sodium carbonate.

Preferably the surface-active agent is of a kind that adsorbs readily at the surface of the lime particles during slaking. Suitable surface-active agents include sugars, such as glucose or sucrose; and, polysaccharides such as starch. More preferably, the surface-active agent is an anionic organic surfactant. Typically the anionic organic surfactant is selected from the following group of compounds their salts and derivatives: any anionic homopolymers or copolymers (e.g. polyacrylic acid and its co-polymers with acrylamide, or polymers bearing hydroxamate functional groups), hydroxamic acids, humic and tannic acids, sulphonated carboxylic acids, and various substituted mono and polycarboxylic acids, particularly polyhydroxy carboxylic acids.

Preferably a concentrated Bayer process liquor with high A/C ratio is employed. Preferably the flows of slaked lime slurry and concentrated liquor are controlled so that the ratio of $Al_2O_3$ to CaO during said ageing step exceeds 0.33:1, expressed as a molar ratio. Most preferably the ratio $Al_2O_3$ to CaO is within the range of approximately 1:1 to 1.5:1, expressed as a molar ratio. Preferably the temperature during the ageing step is maintained at between 95° C. and 110° C., most preferably between 100° C. and 105° C. Typical residence time during said ageing step is between 2 to 4 hours.

DETAILED DESCRIPTION OF PREFERRED EMBODIMENT

Figure 1:
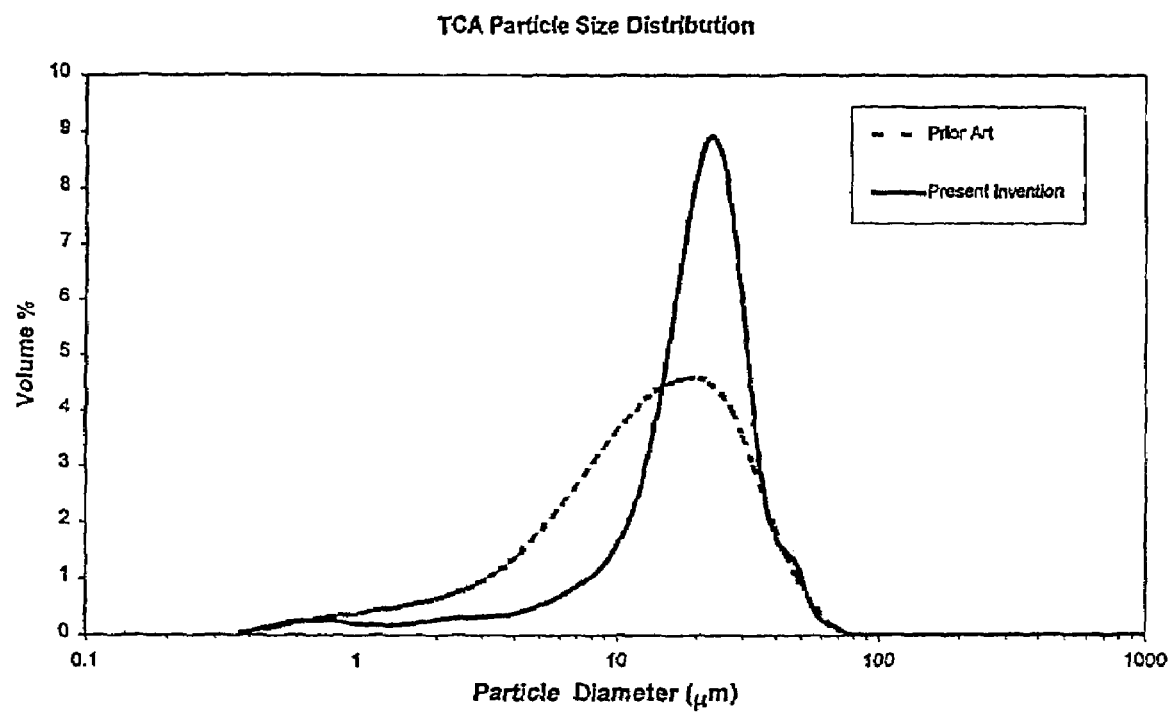
FIG. 1 illustrates graphically the distribution of particle sizes in a TCA filter aid using the preferred process in accordance with the present invention, compared with TCA produced using the prior art technique; and, FIG. 2 illustrates a prior art facility for the production of TCA in an alumina refinery in which the preferred process in accordance with the present invention is performed.

The present invention is based on the discovery that when quicklime is slaked in a solution containing a suitable surface-active agent or agents at the appropriate concentration, the resultant slaked lime slurry will improve TCA formation in the lime ageing facility. These improvements include a narrower and more symmetric size distribution, and a more crystalline structure, leading to substantially improved filtration characteristic.

The inventors have found that, in general, improvements in the size and morphology of TCA particles beyond that of the prior art cannot be achieved through manipulation of the conditions in the lime ageing tank itself. For example, varying liquor composition, the amount of lime, temperature or agitation conditions gave no discernible improvement in the particle size distribution; on the contrary, many combinations of these parameters can result in a substantial worsening of the particle size distribution.

Similarly, experimental evidence suggests that the addition of surface-active agents to the lime-ageing tank has little or no effect on the size distribution or morphology of the TCA particles. The surface-active agents should preferably be added to the slaking solution prior to slaking of the lime. Alternatively the surface-active agents could be added to the slaked lime either during slaking or after slaking.

A variety of surface-active agents could be employed for the purpose described here.

Preferably the surface-active agent adsorbs readily at the surface of the lime particle during slaking. Examples of surface-active agents that could be used for this purpose include sugars such as glucose or sucrose, and polysaccharides such as starch. However, the inventors found that anionic organic surfactants are most effective. A non-exclusive list of examples of this class of compound includes the following materials, their salts and derivatives: any anionic homopolymers or copolymers (e.g. polyacrylic acid and its copolymers with acrylamide, or polymers bearing hydroxamate functional groups), hydroxamic acids, humic and tannic acids, sulphonated carboxylic acids, and various substituted mono and polycarboxylic acids, particularly polyhydroxy carboxylic acids.

The inventors have found that, in general, improvements in the size and morphology of TCA particles beyond that of the prior art cannot be achieved through manipulation of the conditions in the lime ageing tank itself. For example, varying liquor composition, the amount of lime, temperature or agitation conditions gave no discernible improvement in the particle size distribution; on the contrary, many combinations of these parameters can result in a substantial worsening of the particle size distribution.

The amount of the surface-active agent to be dosed is dependent upon the origin and reactivity of the quicklime used, the composition of the slaking solution, and the nature of the surface-active agent used. The requisite dose is best determined by experimentation, with the correct dose determined at the point at which the narrowest TCA size distribution is achieved, together with a suitably coarse mode particle size. It should be noted that either too much or too little surface-active agent will result in a degradation of the filter aid's particle size distribution, though in neither case is this worse than the prior art.

The inventors have found that best performance is obtained if the slaking solution contains some alkali, as for example, if the slaking is performed in the Alumina refinery's lake or process water. A suitable range of alkalinity, expressed as equivalent grams per litre of sodium carbonate, is between 5 and 30 g/L. Lower concentrations can be used, but tend to produce undesirable quantities of coarse slaked lime particles. Too high a concentration will result in the undesirable formation of calcium carbonate, unless the slaking solution is a pure dilute sodium hydroxide solution.

Figure 2:
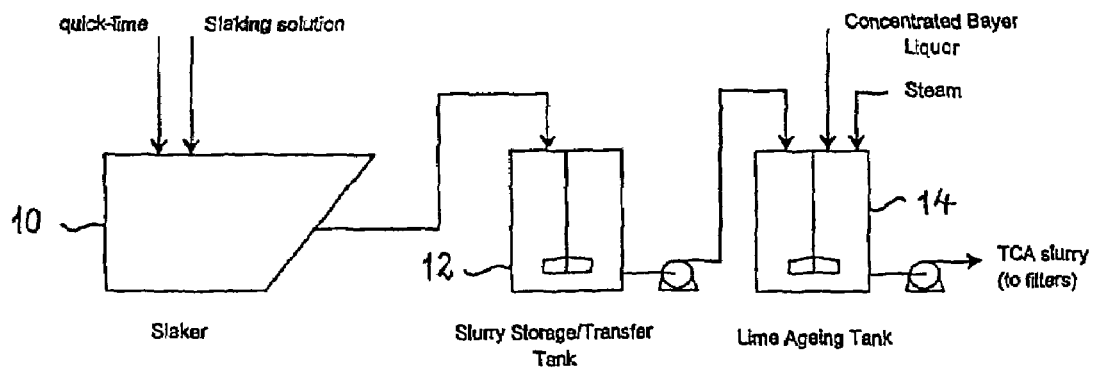

FIG. 2 illustrates a typical prior art TCA production facility that includes a slaker 10 in which quicklime is slaked using a suitable slaking solution. The slaked lime slurry is then transferred to a sired storage/transfer tank 12 before it is pumped to a lime ageing tank 14. A concentrated Bayer liquor and steam are added to the tank 14 to provide a caustic aluminate solution that reacts with the slaked lime. Sufficient residence time is allowed in the lime ageing tank 14 for the initial products of the reaction to "age" before use, forming relatively pure particles of the thermodynamically stable tricalcium aluminate (TCA).

Slaking can be performed in any suitable slaking system, with the surface-active agent either added directly to the slaker (if in liquid form), or first dissolved or dispersed in the slaking solution. Apart from this, no special operating conditions are required other than to ensure that complete slaking of the quicklime has occurred.

As indicated elsewhere, conditions within the lime ageing facility are not overly critical, and acceptable performance will be obtained using the conditions and reactant concentrations used in the prior art procedure. However, best performance is obtained if the following parameters are used:

1) Concentrated liquors with high A/C ratios should be used, such as the alumina refinery's settler overflow liquor.

2) Flows of lime slurry and concentrated plant liquor should be adjusted such that the ratio of $Al_2O_3$ to CaO within the lime ageing tank, expressed as a molar ratio, is within the range of approximately 1:1 to 1.5:1. In any event, the ratio of $Al_2O_3$ to CaO must always exceed 0.33:1.

3) The temperature in the lime ageing tank should preferably be held at between 100° C. and 105° C. Temperatures lower than 95° C. should be avoided. If this is not done, C4A compounds may predominate, probably resulting in poor filtration and increased calcium contamination in refinery product.

4) The residence time should be between 2 and 4 hours. Lower residence times could result in incomplete conversion to TCA, while longer residence times will result in an increase in fine particle formation through attrition and decrepitation. Sensitivity to residence time is increased if low A/C liquors are used.

FIG. 1 shows the particle size, expressed as a volume % distribution, for TCA filter aid produced by the Prior Art technique, together with the size distribution of TCA filter aid produced using the Present Invention. As can be seen, the filter aid produced using the procedure disclosed herein possesses a much narrower and more symmetrical distribution, with a mode that is slightly coarser than that of the Prior Art filter aid.

The following example illustrates one means of applying the invention, and demonstrates the advantages of the new process.

Results of Plant Trial

To test the invention, a series of three full-scale trials were conducted in the alumina refinery over a period of several weeks. These were conducted as a sequence of on/off trials, alternating between the prior art procedure and the improved procedure. This enabled direct comparisons to be made between the two processes while partially compensating for variations in refinery operation.

Quicklime was slaked in the normal manner, but with the addition of a surface active agent, in this case sodium gluconate. The sodium gluconate was delivered as a 400 g/L aqueous solution, directly into the slaking tank. Slaking was performed using process water, with the 'S' concentration controlled to between 8 and 15 g/L, expressed as equivalent g/L of sodium carbonate. A slurry of 15% CaO by weight was targeted. The sodium gluconate dose rate was calculated to give a concentration of 390 mg/L in the slakers, or 110 mg/L in the lime ageing facility.

After some time was allowed for the treated material to reach the lime ageing facility and for the TCA filter aid in the tank to be fully turned over, samples were collected and compared with the normal TCA filter aid. Typical results are shown in FIG. 1. After several days' operation, dosing of the sodium gluconate was ceased to allow the material to return to its normal state. This cycle of on/off dosing was repeated several times over the duration of the test work. In each case, the change in size distribution shown in FIG. 1 was achieved. The performance of the refinery's polishing (or security) filtration system was also monitored over this period. Performance of the filters in terms of the filtrate mass flux, measured as m/hr (or $m^3$ of flow per hour, per $m^2$ of filter cloth), was recorded, with the filters operated at a constant pressure of approximately 320 kPa.

Results of the on/off testing are shown in Table 1 below, together with the operating parameters for the test.

TABLE 1

Filtration Performance During Plant Trial

| Trial No. | Test | Filtration Rate ($m^3 m^{-2} h^{-1}$) | Applied Pressure (kPa) |
|---|---|---|---|
| 1 | Prior Art | 0.67 × 0.10 | 313 |
|   | Present Invention | 0.94 × 0.05 | 304 |
| 2 | Prior Art | 0.73 × 0.08 | 328 |
|   | Present Invention | 0.91 × 0.06 | 325 |
| 3 | Prior Art | 0.67 × 0.08 | 335 |
|   | Present Invention | 0.91 × 0.06 | 331 |
| AVERAGE | Prior Art | 0.68 × 0.09 | 325 |
|   | Present Invention | 0.92 × 0.06 | 322 |

The average improvement in filtration rate is approximately 35%. Filtrate solids were typically less than 5 mg/L. In addition, during the trial, calcia contamination of the refinery's product alumina fell to less than 0.027% w/w, from a previous average of approximately 0.038%.

Now that an example of the preferred embodiment of the process in accordance with the invention has been described in detail, several advantages of the described process will be apparent. These include:

A. The process is simple to implement and should require no new equipment other than dosing facilities for the surface-active agent.

B. Dramatic and immediate improvements in filtration rate in the polishing filtration facility of approximately 35% can be obtained. This reduces the number of filters that are required to achieve target flows, or alternatively, permits flows to be increased by up to 35% without requiring additional filtration equipment.

C. Filtration performance is generally maintained for longer periods, increasing the filter cycle time and reducing wash and cleaning requirements.

D. The combination of B and C can reduce filter cloth consumption.

E. The process is robust. Small variations in the dosing of the surface-active agent have little effect, while gross misdosing tends to result in the TCA particle size distribution reverting to that of the prior art.

F. The improved consistency of the filter aid leads to reduced filtrate solids, giving lower iron contamination of the product alumina.

G. The improved crystallinity and particle size of the filter aid leads to considerably reduced calcium contamination of the product alumina.

H. The improved consistency of the filter aid contributes to more stable operation of the polishing filtration facility. This can result in an improvement in the refinery's availability factor, thereby increasing productivity.

It will be apparent to persons skilled in the chemical and process engineering arts that numerous variations and modifications may be made to the described process, in addition to those already described, without departing from the basic inventive concepts. All such variations and modifications are to be considered within the scope of the present invention, the nature of which is to be determined from the foregoing description and the appended claims. Furthermore, the described examples are provided for illustrative purposes only and are not to be construed as limiting the scope of the invention in any way.

The invention claimed is:

1. A process for the production of tricalcium aluminate (TCA) filter aid for use in an alumina refinery, the process including the steps of:
   slaking lime in a slaking solution to form a slaked lime slurry;
   dosing the slaking solution or slaked lime slurry with a surface-active agent selected from a group consisting of sugars, polysaccharides, anionic organic surfactants and mixtures thereof, to form a dosed slaked lime slurry; and
   reacting the dosed slaked lime slurry with a Bayer process liquor to produce tricalcium aluminate (TCA) filter aid.

2. A process for the production of tricalcium aluminate (TCA) filter aid as recited in claim 1, wherein the steps of dosing and slaking occur simultaneously or sequentially.

3. A process for the production of tricalcium aluminate (TCA) filter aid as recited in claim 1, wherein quicklime is slaked to form the slaked lime slurry.

4. A process for the production of tricalcium aluminate (TCA) filter aid as recited in claim 1, wherein the slaking solution is alkaline.

5. A process for the production of tricalcium aluminate (TCA) filter aid as recited in claim 4, wherein the slaking solution has an alkalinity within the range of 5 to 30 g/l, expressed as equivalent grams per litre of sodium carbonate.

6. A process for the production of tricalcium aluminate (TCA) filter aid as recited in claim 1, wherein the surface-active agent is of a kind that adsorbs readily at the surface of the lime particles during slaking.

7. A process for the production of tricalcium aluminate (TCA) filter aid as recited in claim 1, wherein the sugars are selected from the group consisting of glucose sucrose and mixtures thereof.

8. A process for the production of tricalcium aluminate (TCA) filter aid as recited in claim 1, wherein the polysaceharides comprise starch.

9. A process for the production of tricalcium aluminate (TCA) filter aid as recited in claim 1, wherein the anionic organic surfactant is selected from the group consisting of anionic homopolymers, anionic copolymers, hydroxamic acids, humic acid, tannic acid, suiphonated carboxylic acids, substituted monocarboxylic acids, substituted polycarboxylic acids, salts or derivatives thereof and mixtures thereof.

10. A process for the production of tricalcium aluminate (TCA) filter aid as recited in claim 1, wherein a concentrated Bayer process liquor with a high A/C ratio is employed.

11. A process for the production of tricalcium aluminate (TCA) filter aid as recited in claim 10, wherein the flows of slaked lime slurry and concentrated liquor are controlled so that the ratio of $Al_2O_3$ to CaO during the reacting step exceeds 0.33:1, expressed as a molar ratio.

12. A process for the production of tricalcium aluminate (TCA) filter aid as recited in claim 11, wherein the ratio $Al_2O_3$ to CaO is within the range of approximately 1:1 to 1.5:1, expressed as a molar ratio.

13. A process for the production of tricalcium aluminate (TCA) filter aid as recited in claim 1, wherein the temperature during the reacting step is maintained at between 95° C. and 110° C.

14. A process for the production of tricalcium aluminate (TCA) filter aid as recited in claim 13, wherein the temperature during the reacting step is maintained between 100° C. and 105° C.

15. A process for the production of tricalcium aluminate (TCA) filter aid as recited in claim 1, wherein residence time during the reacting step is between 2 to 4 hours.

16. A process for the production of tricalcium aluminate (TCA) filter aid as recited in claim 2, wherein quicklime is slaked to form the slaked lime slurry.

17. A process for the production of tricalcium aluminate (TCA) filter aid as recited in claim 2, wherein the surface-active agent is a kind that adsorbs at the surface of lime particles during slaking.

18. A process for the production of tricalcium aluminate (TCA) filter aid as recited in claim 2, wherein a concentrated Bayer process liquor with a high A/C ratio is employed.

19. A process for the production of tricalcium aluminate (TCA) filter aid as recited in claim 2, wherein the temperature during the reacting step is maintained at between 95° C. and 110° C.

20. A process for the production of tricalcium aluminate (TCA) filter aid as recited in claim 2, wherein the temperature during the reacting step is maintained between 100° C. and 105° C.

21. A process for the production of tricalcium aluminate (TCA) filter aid as recited in claim 2, wherein a residence time during the reacting step is between 2 to 4 hours.

22. A process for the production of tricalcium alunilnate (TCA) filter aid as recited in claim 9, wherein the anionic copolymers are selected from the group consisting of polyacrylic acids, copolymers of polyacrylic acid and acrylamide, polymers including hydroxamate functional groups and mixtures thereof.

* * * * *